//. United States Patent [19]

Orshansky, Jr.

[11] 3,709,061
[45] Jan. 9, 1973

[54] NON-REGENERATIVE HYDROMECHANICAL TRANSMISSION

[75] Inventor: Elias Orshansky, Jr., San Francisco, Calif.

[73] Assignee: URS Systems Corporation, San Mateo, Calif.

[22] Filed: Feb. 16, 1971

[21] Appl. No.: 115,596

[52] U.S. Cl. .................................................. 74/687
[51] Int. Cl. ............................................... F16h 47/04
[58] Field of Search ............................. 74/687, 761

[56] References Cited

UNITED STATES PATENTS

| 2,194,954 | 3/1940 | Ravigneaux | 74/761 |
| 2,214,335 | 9/1940 | Kurti | 74/761 |
| 3,212,358 | 10/1965 | De Lalio | 74/687 |
| 3,306,129 | 2/1967 | De Lalio | 74/687 |
| 3,383,953 | 5/1968 | Christenson | 74/687 X |
| 3,580,107 | 5/1971 | Orshansky, Jr. | 74/687 |

Primary Examiner—William L. Freeh
Assistant Examiner—Thomas C. Perry
Attorney—Owen, Wickersham & Erickson

[57] ABSTRACT

An input means and an output means are connected together by a plurality of gear trains which are intermediately connected to each other by a first planet gear set of a planetary gear arrangement. The planetary gear arrangement also has a second planetary gear set intermeshed with the first set. The gear trains are of overlapping speed ratios and are successively connected to drive the output means through a preselected speed range, with means being provided for disconnecting each driving train from the output means after the following train has been connected to it. In a preferred form, the planetary gear set has a pair of alternately used output gears, both meshing with the first set of planet gears, one output gear being a sun gear, the other being a ring gear. A novel system employs each output gear, at times, in a reaction system incorporating a reaction gear meshed with the second planetary gear set. A first hydraulic unit is in driving engagement with that reaction gear and a second hydraulic unit is hydraulically connected to the first hydraulic unit, with one of the hydraulic units serving as a pump while the other one serves as a motor and vice versa. Means are provided for alternately connecting and disconnecting the output gears to the second hydraulic unit, for use in the reaction system.

20 Claims, 12 Drawing Figures

INVENTOR.
ELIAS ORSHANSKY, JR.

BY

Owen, Wickersham & Erickson

ATTORNEYS

NON-REGENERATIVE HYDROMECHANICAL TRANSMISSION

BACKGROUND OF THE INVENTION

This invention relates to a non-regenerative hydromechanical transmission. A pair of hydraulic units is employed in connection with a planetary gear arrangement. This transmission is especially useful in trucks and other automotive vehicles.

A purpose of this invention is to provide a commercially producible transmission which enables an improved method of utilizing vehicle engine power. This improved method makes it possible for the engine to operate within a narrow speed range that has been optimized for minimum emissions, maximum fuel economy, and maximum power, regardless of vehicle operating conditions.

Conventional torque converter and manual transmissions have imposed many compromises upon the engine system, due to the requirement of providing adequate performance over a wide range of torques and speeds. The practice of most vehicle manufacturers of offering a selection of optional axle ratios for the vehicle purchaser is but one of many attempts to reduce the compromise for any given application.

With an infinitely variable transmission, an engine can always be operated in a speed range where it is capable of producing rated power; hence, vehicle performance in any given application can be maintained or even improved while utilizing a substantially smaller engine. Infinitely variable transmissions of the pure hydrostatic type are limited to applications where significant power losses can be tolerated in return for the benefits of improved transmission ratio control. Hydromechanical transmissions offer the control benefits of a hydrostatic transmission but by virtue of the fact that only a portion of the engine power is transmitted by the hydraulic units, they remove the performance barrier of excessive power losses. The extent to which any hydromechanical transmission can accomplish this end is strictly a function of the percentage of power which must be transmitted hydraulically.

The invention provides for minimum hydraulic power transmission while avoiding the pitfalls of excessive complexity, speeds, or loads in the gear trains. Maximum reliability and minimum cost can be obtained, by utilizing standard commercial hydraulic units which are operated totally within their long-life rated conditions of speed and power. In addition the clutches can be of the low-cost types presently employed in high production automobile torque-converter transmissions. A smaller number of elements can be utilized, however, for a comparable power rating, than in a torque converter transmission, due to the fact that at all shift points the clutch elements are virtually synchronous. The number of elements is therefore a function not of their thermal capacity but of their steady-state torque capacity.

By applying the transmission of this invention to a piston engine, exhaust emissions can be reduced, and the specific fuel consumption can be improved by programming the engine to operate within its optimum range under all road conditions without regard to transmission torque output. Both nitrogen oxide emissions and hydrocarbon emissions can be minimized, by optimizing the engine combustion process for operation in a specific narrow range. In addition, the invention enables the use of a smaller engine for any application, as the transmission will allow full engine power to be developed at any vehicle speed except for the lower speeds where the vehicle is traction limited.

These same considerations also apply to a rotary combustion chamber engine, and there the benefits in reduction of hydrocarbon emissions are of much greater magnitude, due to the high rate of change in emission characteristics for a rotary combustion chamber engine with respect to engine speed.

Benefits are also derived from the application of this type of transmission to a gas turbine. The major drawback in producing such turbines today is their cost of manufacture, and this cost is, to a large degree, a function of the complexity necessitated by the design of a turbine for use under the varying torque and speed requirements of a road vehicle. The single-shaft type of turbine is not only more economical to manufacture than the two-shaft design normally proposed for vehicle application, but it is also more efficient if operated within the band of its maximum efficiency. With the hydromechanical transmission of this invention, a turbine can be programmed to operate only under those conditions during which it is most efficient.

The transmission of this invention is applicable to many fields, including passenger cars, highway trucks, and off-the-highway trucks, agricultural equipment, construction equipment, military vehicles, and industrial drives.

In a prior invention of mine I provided a combination in which two sets of planet gears mounted on the same carrier meshed with each other. This invention also employs that combination. However, in that prior invention each set of planet gears meshed with a separate output member, typically two separate ring gears. In the present invention both of the output members mesh with the same set of planet gears. Also, in the former invention, there were gear trains between the planetary arrangement and the final output member, but in the present invention there are no gear trains between the planetary output members and the final output shaft; there are only clutches between them. This provides an important advantage, in that the driving torque is transmitted by the several planet meshes rather than by a single mesh at gears beyond the planetary arrangement. Therefore, quite heavy loads can be applied to lighter gears.

A significance of the avoidance of overloading the single teeth of gears lies in the fact that torque developed in transmissions is high, and where there are any gear-ratio sets beyond the planetary assembly, the tooth loading of these gear sets becomes extremely high. By providing a structure in which the transmission has no output shifts beyond or outside of the planetary assembly, this difficulty is minimized. In this invention, the output shifts are directly from the planetary members to the final output, and they are accomplished by means of clutches. Hence, no gear-tooth loads are involved there, and the only gear-tooth loads which are encountered are those within the planetary gear assembly, where they are divided, since several planet gears are meshed with the output gear, instead of just one pair of gears being meshed with each other.

Another interesting distinction is that the planetary gear arrangement and the final output shaft are co-axial. A further difference is that the second set of intermeshing planet gears meshes only with the first set and with a reaction gear.

A very important feature of the invention is the elimination of regenerative horsepower. In the present invention, the hydraulic horsepower is handled by the hydraulic system either as additive within the planetary gear arrangement or as output coupled, where the hydraulic system adds power directly to the output. Thus, power can be handled over a wide range without regenerative power within the planetary assembly. This makes it possible to use small hydraulic units and a small number of gears and clutches. The invention is therefore characterized by great simplicity so far as the number of gears, clutches, and shafts are concerned and in relatively small size so far as the hydraulic units are concerned—and therefore in so far as the entire unit is concerned.

One of the reasons for the simplicity of the invention is that a variable speed planetary arrangement is used in place of what would otherwise have to be final steps of gearing.

The invention is significant in its great reduction of corner horsepower. "Corner horsepower" is a term applied to the maximum horsepower that the unit would be capable of, if it ran at a combination of both its maximum torque and its maximum speed, applied simultaneously. While this condition never actually arises, its significance is that it is the condition that governs the size of the hydraulic units. By holding corner horsepower down, the size of the hydraulic units is reduced.

This is a relatively wide ratio transmission, and thus is particularly suited for use in trucks and other vehicles where a combination of high horsepower and wide reduction ratio exists. In order to accomplish a wide reduction efficiently, it is necessary to reduce the amount of hydraulic horsepower being transmitted, and, in order to be able to build a commercially feasible unit, it is necessary to reduce the amount of corner horsepower and the size of the hydraulic unit, as described above. Moreover, as already stated, in accomplishing its high efficiency, this invention eliminates regenerative horsepower.

BRIEF SUMMARY OF THE INVENTION

The input shaft transmits power, preferably through an intermediate gear, to a planetary input member such as a planet carrier. This carrier carries two sets of planet gears which are meshed with each other. Each of the two sets of planet gears meshes with a different sun gear, and the separate shafts on which the sun gears are mounted are co-axial with each other and with the final output shaft. One set of the planet gears is meshed with, not only one of the sun gears, but also with a ring gear and it is through this single set of planet gears that both of the two alternative outputs are obtained. One output is thus provided by the ring gear, which is clutchable directly to the final output shaft, and the other output is provided by the sun gear meshed to the same planets as is the ring gear, and that sun gear is connected by clutching means directly to the final output shaft.

The second set of planet gears engages the second sun gear on a shaft that supports another gear which is meshed with a gear on an additional shaft, which usually serves as a reaction shaft, but serves for output purposes during starting and reverse conditions. This reaction shaft drives, or is driven by, one of two hydraulic units. The other hydraulic unit has its own auxiliary shaft, and the two units are hydraulically connected together. The auxiliary shaft mounts a pair of auxiliary gears, one of which meshes with a gear on the shaft carrying the output sun gear, and the other meshes with a gear rigidly mounted on the same structure as the output ring gear. These two auxiliary gears are each separately clutchable to the auxiliary shaft. Through these, the "output" gear which is not being used for output, is used in the reaction system at some times and is used to add hydraulic power directly to the output without transmitting that hydraulic power through the gear teeth of the planetary gearing.

The reaction shaft also supports a gear that is used during starting and reverse operations, to drive a gear which is clutchable to the final output shaft.

In order to simplify the description of operation of the invention and to set forth a complete description, so that other objects and advantages of the invention will become apparent, the following detailed description of a preferred embodiment is given.

DESCRIPTION OF A PREFERRED EMBODIMENT

Figure 1:
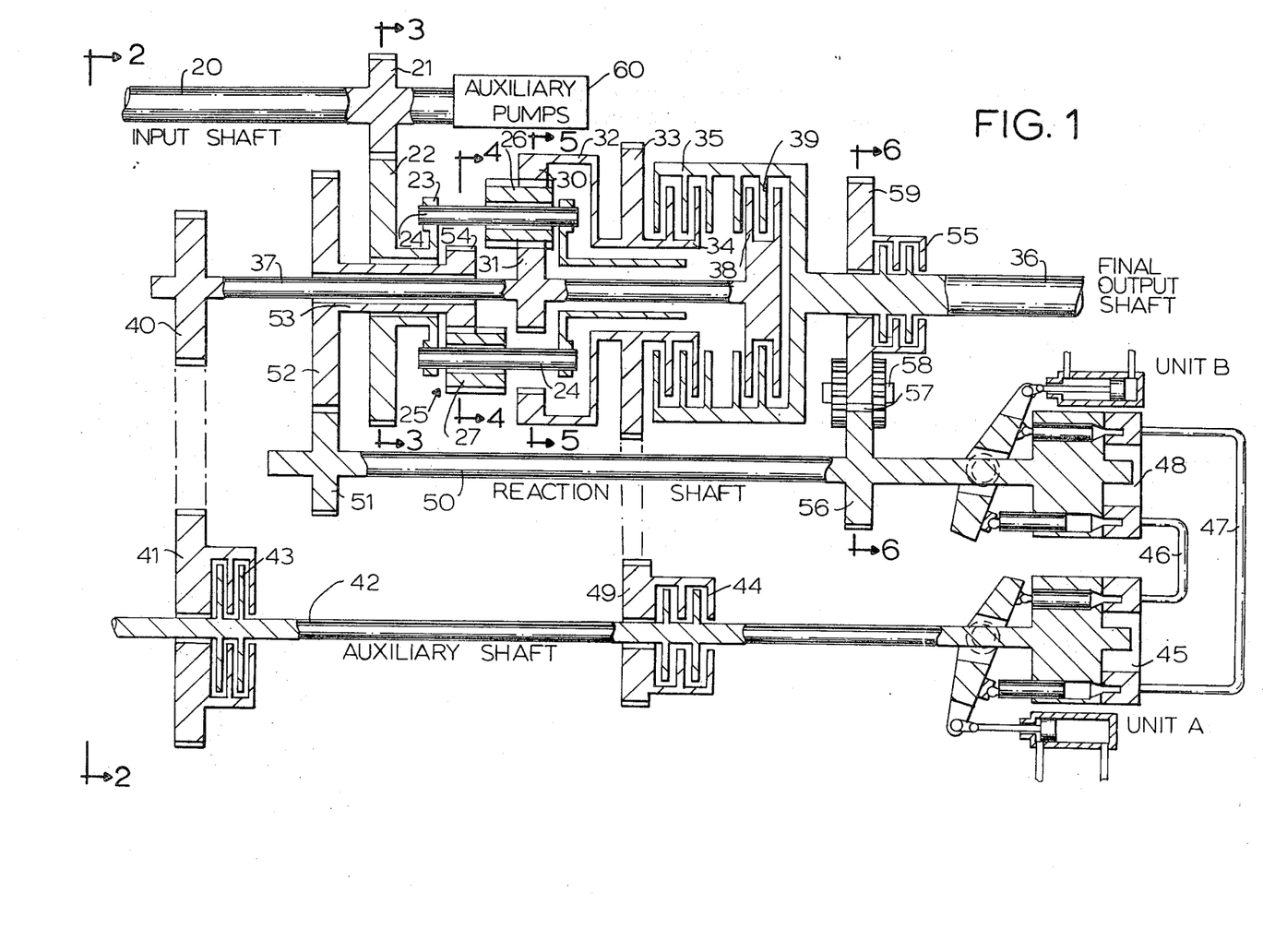
FIG. 1 is a diagrammatic view generally in elevation and in section of a transmission embodying the principles of the invention. Certain gears are shown not touching, though they are actually in mesh, with broken lines indicating their touching, the true position of these gears being shown in other figures.
Figure 4:
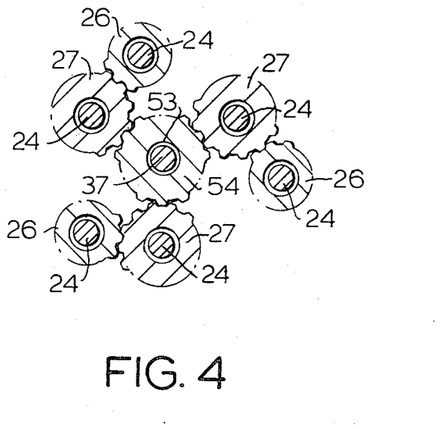
FIG. 4 is a view in section taken along the line 4—4 in FIG. 1.

An input shaft 20 acts through gears 21 and 22 to drive a planet carrier 23 having shafts 24, and forming part of a planetary gear assembly 25. Thus, in this transmission the planet carrier 24 serves as the input member of the planetary gear assembly 25. The planet carrier 24 carries two intermeshing sets of planet gears 26 and 27. In FIG. 1, only one of each of the gears 26 and 27 is shown, with the others being shown in FIGS. 4 and 5.

The planet gears 26 all mesh with a ring gear 30 and an output sun gear 31, which are the two output gears of the planetary gear assembly and are used alternately. As will be seen later, during part of the time while the gear 30 is being used as an output gear, the gear 31 is being used for reaction, and vice versa. The ring gear 30 forms part of an assembly 32, providing a gear 33 and a clutching portion 34. The clutching portion 34 is engageable with a clutching portion 35 that is rigidly secured to a final output shaft 36. It should be noted that the ring gear 30 and its assembly 32 are co-axial with the final output shaft 36, as are the planetary gear assembly 25 itself and the output sun gear 31.

The output sun gear 31 is mounted rigidly on a shaft 37 which has clutching elements 38 that are engageable by clutching elements 39 which are directly connected to the final output shaft 36.

From what has been said already it will be evident that the planetary gear assembly 25 provides three gears 26 meshing with both of the output gears 30 and 31, so that power flow is minimized at these meshes. Beyond these points there are no gears between these output gears 30 and 31 and the final output shaft 36 -- only the clutches 34, 35 and 38, 39 by which the output gears 30 and 31 are alternately clutched to or unclutched from the final output shaft 36. Generally, only one output at a time will be clutched to the shaft 36 except during the actual shifting from one to the other; then, one of the clutches is already engaged, and the second one is engaged before the first one is disengaged.

Figure 2:
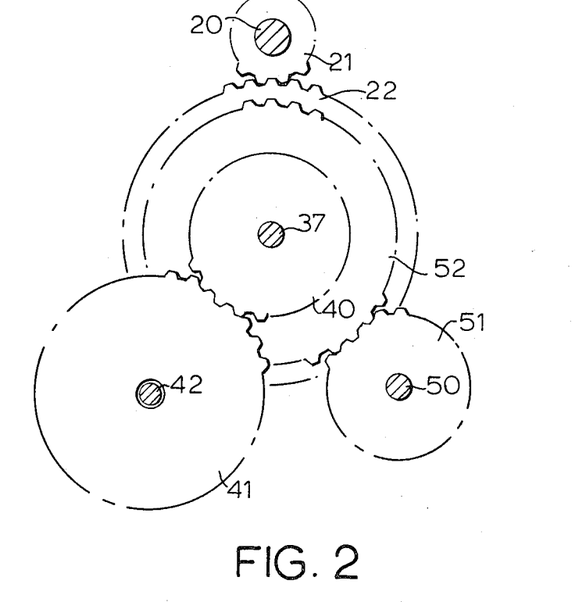
FIG. 2 is a view in section taken along the line 2—2 in FIG. 1.
Figure 3:
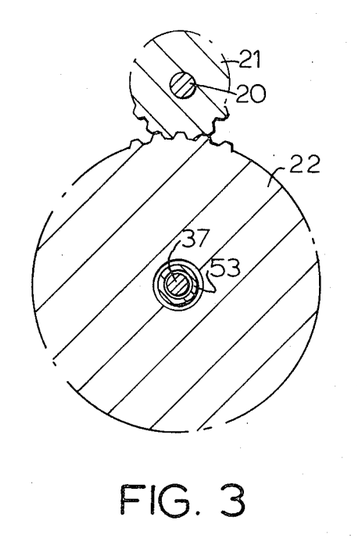
FIG. 3 is a view in section taken along the line 3—3 in FIG. 1.

The shaft 37 which carries the output sun gear 31 also carries a gear 40 which meshes (see FIG. 2) with a gear 41 that is mounted on, and clutchable to an auxiliary shaft 42 by a suitable clutch 43. The auxiliary shaft 42 also carries a clutch 44 by which a gear 49 can be clutched to the shaft 42. The gear 49 engages the gear 33, which is rigidly attached to the ring gear 30. From this it will be apparent that the auxiliary shaft 42 is clutchable alternately to gears which are driven directly by either of the two output gears 30 and 31, and again this clutching is done at different times with an overlap between them.

The auxiliary shaft 42 is in driving relation to a hydraulic A unit 45, which is connected by conduits 46 and 47 to a hydraulic B unit 48. The hydraulic B unit 48 is in driving relation with a shaft 50 which usually operates as a reaction shaft and rigidly carries a gear 51 that is meshed to a gear 52. The gear 52 is rigidly connected by a shaft 53 to a second sun gear 54 that meshes with the second set of planet gears 27. Note that the second set of planet gears 27 meshes only with the second sun gear 54 and with the other planet gears 26. The second sun gear 54 operates principally as a reaction gear, as will be seen.

The shaft 50 carries a gear 56, and the gear 56 may be connected through an idler gear 57 on a shaft 58 to a gear 59 that is clutchable to the final output shaft 36, by a clutch 55.

Auxiliary pumps 60 may be driven by the input shaft 30 for supercharging, lubricating, etc., the transmission. Due to high speed of rotation, the case of the transmission (not shown) is preferably operated with a dry sump; so one of the pumps 60 scavenges the case, drives the oil through an oil cooler, and returns it to an oil reservoir. Another pump of the pumps 60 picks oil up from the reservoir and puts it through a filter and through a check valve into whichever hydraulic line (e.g., 46 or 47) is the low pressure line. This makes up leakage within the hydraulic system, and feeds oil through orifices for lubrication of gears and bearings. A relief valve maintains the outlet of this pump at about 180 PSI. A third pump of the pumps 60 picks up oil from the reservoir and supplies pressure for clutch and hydraulic unit actuation. A relief valve for this circuit may be set at approximately 400 PSI. It is possible to combine some or all of the functions of these pumps, so that two or even one pump may be used to serve all the above functions.

The clutches are all schematically shown as multiple plate friction clutches, but they may be dog clutches or other types of clutches, due to the almost perfect synchronization at all the shift points.

The two hydraulic units 45 and 48 are both variable units and are connected together so that when one operates as a pump, the other operates as a motor and vice versa. Thus, in the starting and reverse ranges and in speed Range II the hydraulic A unit 45 operates as a pump, and its stroke gradually decreases until it reaches zero at a shift point and then in speed Ranges I and III increases in the opposite direction, the A unit 45 then operating as a motor. Conversely, the B unit 48 operates as a motor in starting and reverse and in speed Range II; its speed gradually slows to zero at a shift point and then it turns in the opposite direction in speed Ranges I and III, operating as a pump. At the shifting points from Range I to Range II and from Range III to Range IV, the A unit 45 that has immediately prior to that point been operating as a motor becomes a pump, and the B unit 48 which has been operating as a pump again becomes a motor.

During starting and reverse, the clutches 55 and 44 are engaged. The direction of rotation of the output shaft 36 is determined by the stroking mechanism of the hydraulic A unit 45. At the shift from the starting range to Range I, (see FIG. 9), the clutch 34, 35 is engaged and, immediately afterwards the clutch 55 is disengaged. In shifting into Range II (FIG. 9) the clutch 34, 35 remains engaged, the clutch 43 is engaged, and then the clutch 44 is disengaged. In shifting from Range II into Range III, the clutch 38, 39 is engaged and then the clutch 34, 35 is disengaged, the clutch 43 remaining engaged. In shifting from Range III to Range IV the clutch 38, 39 remains engaged, the clutch 44 is engaged again, and the clutch 43 is then disengaged. Thus, the clutches 43 and 44 are overlapping and one is engaged before the other is disengaged at the point where the change is made between them. Similarly the clutches 34, 35, and 38, 39 overlap at the point of shifting when the speeds are synchronized.

Starting with the speed of the output shaft 36 at zero and a given constant speed on the input shaft 20, the starting range requires that the clutches 44 and 55 be engaged, as described. Consequently, the power goes from the shaft 20 through the gears 21 and 22 into the carrier 23. In this starting range and in reverse and at no other time, the reaction sun gear 54 is an output gear; it then delivers power to the gear 52 and through the gear 51 to the reaction shaft 50 and thence through the gear 56 to the idler 57 and the output gear 59, which is then clutched to the output shaft 36 by the clutch 55. Thus the mechanical power flow proceeds from the gear 21 via the gear 22, the carrier 23, the planet gears 26, the planet gears 27, the sun gear 54, and the gears 52 and 51 to the shaft 50 and from there via the gears 56, 57 and 59 to the output shaft 36. The flow of power to drive the hydraulic A unit 45 also enters from the input shaft 20 by the same path to the carrier 23 and the planet gears 26. From there this power goes to the ring gear 30 and from there through the gear 33 and the gear 49 to the auxiliary shaft 42. The hydraulic A unit 45 then acts as a pump and delivers hydraulic horsepower to the B unit 48. The B unit 48 then adds its power to the reaction shaft 50, and therefore to the output shaft 36. This starting range extends from zero speed to the point where the input reaches full horsepower, and during this range the output torque is constant.

As soon as the input reaches this constant horsepower level, Range I is entered. In order to enter this range the output clutch 34, 35 is engaged just prior to disengagement of the clutch 55. The clutch 44 remains engaged. At this point the ring gear 30 becomes the output gear, and the sun gear 54 becomes the reaction gear. Consequently, the A unit 45 becomes a motor, although it has been a pump throughout the starting range, and the B unit 48 becomes a pump. The A unit 45 adds its torque to the output shaft 36 via the gears 49 and 33, which lie beyond the planetary gear assembly 25. This is a very important feature, for it is what makes the transmission non-regenerative. The power is divided by the planetary gear assembly 25 into a hydraulic path and a mechanical path, and then the hydraulic power is added to the output shaft 36 beyond the planetary gear assembly 25.

Figure 9:
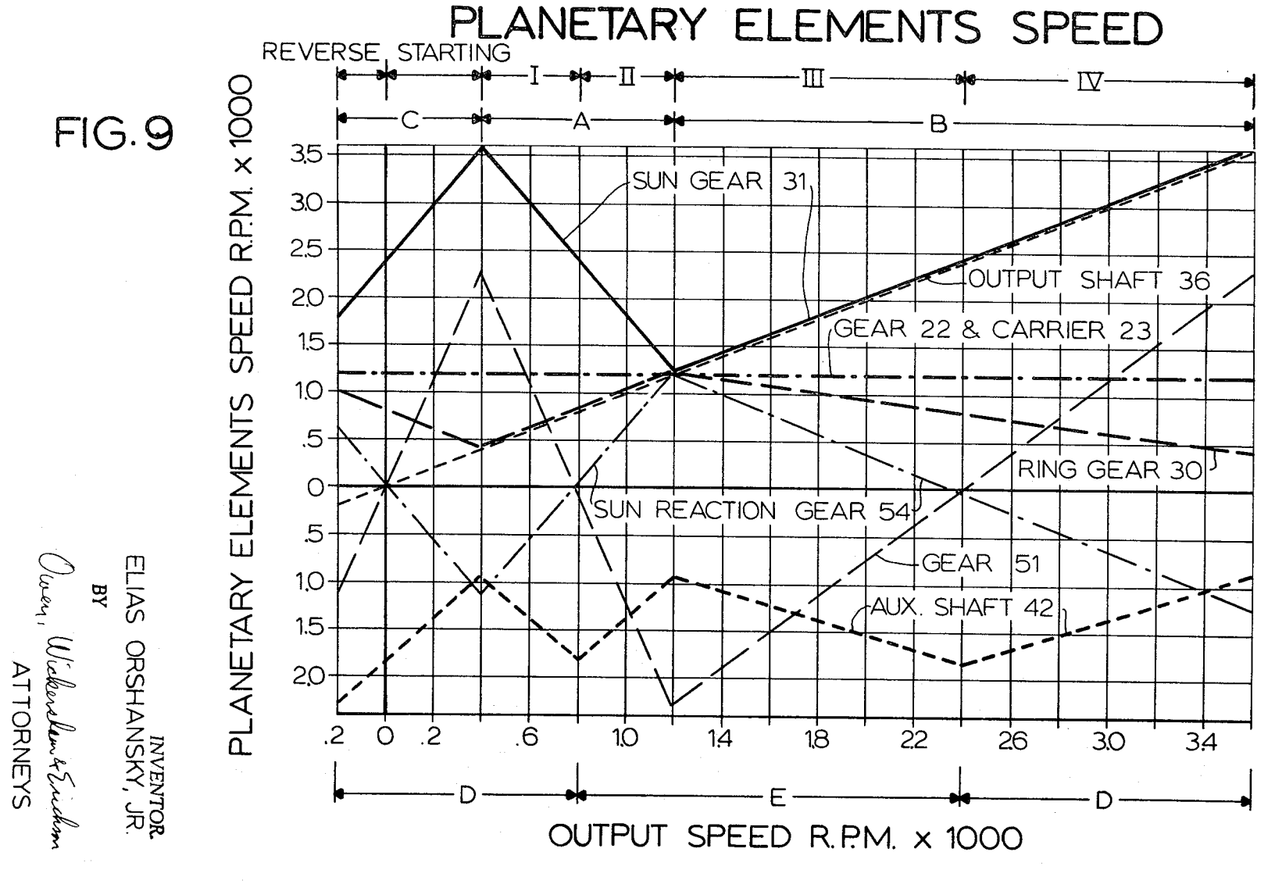
FIG. 9 is a graph of the planetary elements speed for the transmission of FIGS. 1 through 6, with the speeds of the planetary elements and some other elements in increments of 1,000 RPM plotted against the output speed in increments of 1,000 RPM.
Figure 12:
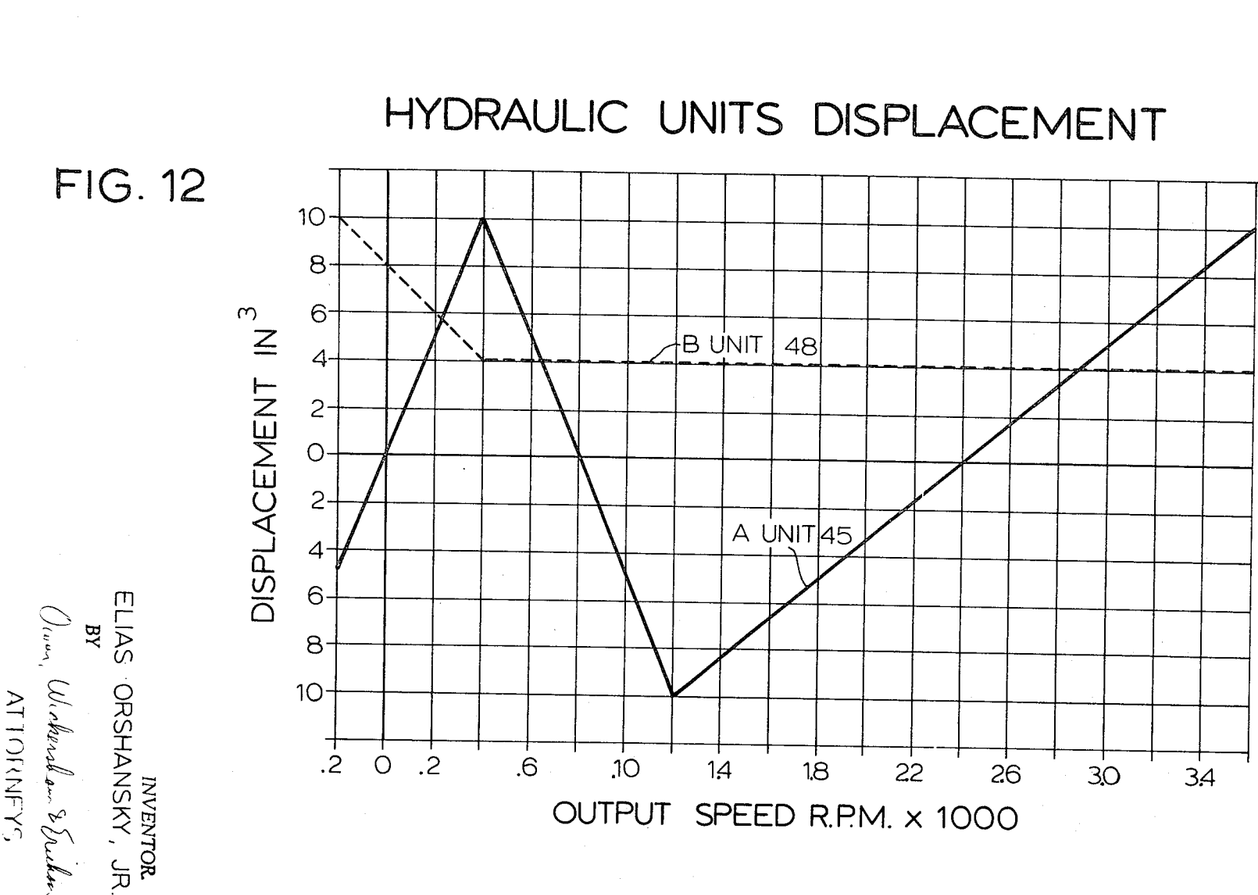
FIG. 12 is a graph of the hydraulic unit displacement for the transmission of FIGS. 1 through 6, with the displacement in cubic inches plotted against the output speed in increments of 1,000 RPM.

Range I continues, as shown on the speed line in FIG. 9 and the stroke of the A unit 45 is reduced as the speed increases, as shown in FIG. 12. At the point where the stroke in FIG. 12 of the A unit 45 reaches zero, the B unit 48, which has been decreasing its speed as shown in FIG. 9, comes to a standstill. Throughout Range I, the B unit 48 has been in constant displacement, and the A unit 45 has been decreasing its stroke from the beginning of that range until its end where it reaches zero displacement. At that time the A unit 45 is therefore spinning without transmitting power, so that a no-power shift can be made, and at this point the shift is made from Range I to Range II by engaging the clutch 43 and then disengaging the clutch 44. In this instance, the exact accuracy of the overlap is not as important as in the change from the clutch 34, 35 to the clutch 38, 39 since the A unit 45 transmits no horsepower and is spinning on zero stroke.

Figure 11:
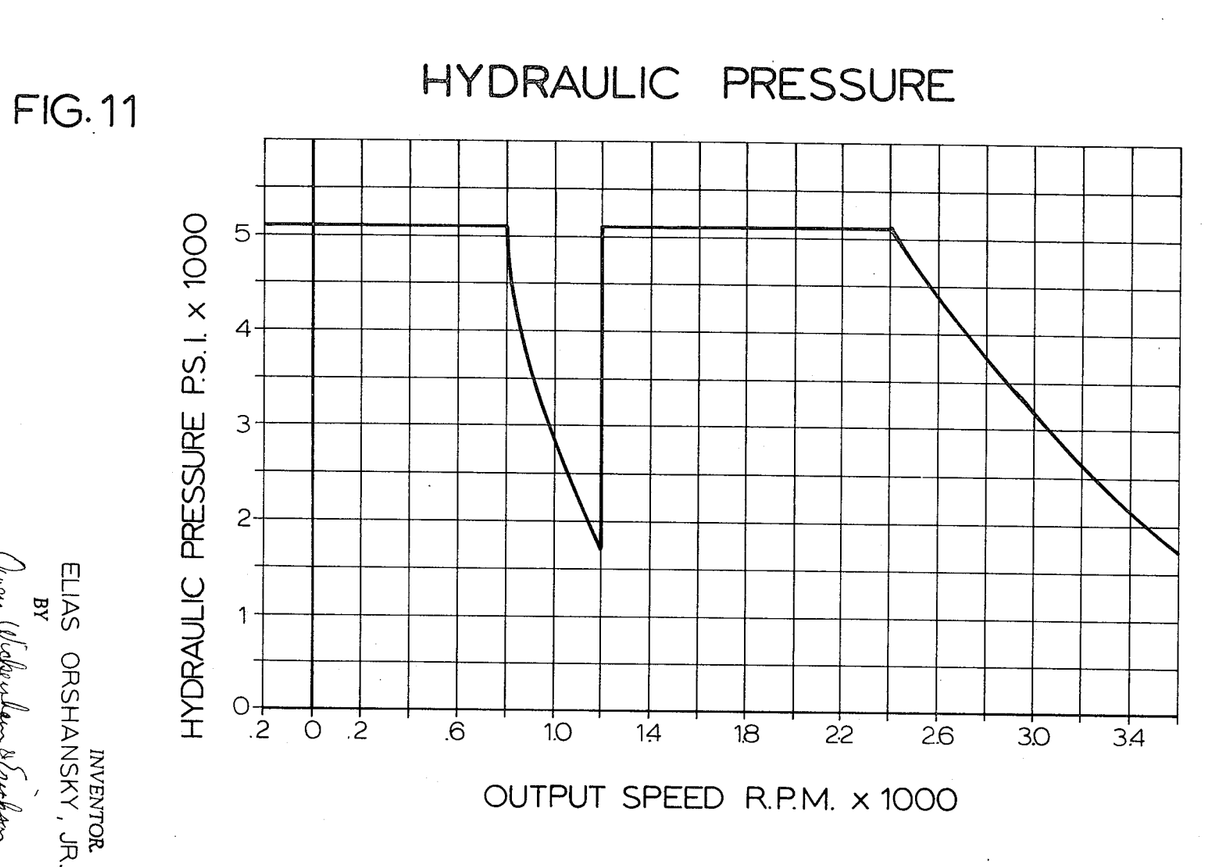
FIG. 11 is a graph of the hydraulic pressure for the transmission of FIGS. 1 through 6, with the hydraulic pressure in pounds per square inch in increments of 1,000 plotted against the output speed in increments of 1,000 RPM.

The hydraulic pressure remains constant throughout Range I, as shown in FIG. 11. This is an advantage of the non-regenerative system which avoids a very high spike of pressure that would be encountered in a regenerative operation. This operation during Range I may be called "output coupled," because the hydraulic power is added directly to the output by the A unit 45, and the B unit 48 is acting as a pump with the A unit 45 acting as a motor.

After the shift from Range I to Range II, which engages the clutch 43 and connects the A unit 45 to the gears 41 and 40, the sun gear 31 begins to act as a reaction gear. The hydraulic A unit 45 begins to be stroked in the opposite direction, as shown in FIG. 12, so that whereas previously it was a motor now it begins to act as a pump and transmits horsepower through the B unit 48, which now acts as a motor while continuing to be connected to the gears 51 and 52 and therefore to the reaction sun gear 54. The drive continues to be transmitted mechanically through the output ring gear 30 and the clutch 34, 35 to the output shaft 36. The B unit 48 rotates in such a direction as further to speed up the output gear 30. This also occurs without recirculating any hydraulic horsepower through the planetary gear assembly 25, and thus regenerative horsepower in the transmission is again avoided.

While the speed of the output ring gear 30 is being increased throughout Ranges I and II, the speed of the sun output gear 31 has been decreasing. Of course, this gear 31 has been disconnected from the output because the clutch 38, 39 is not engaged in Ranges I and II. At the end of Range II, the speeds of the gears 30 and 31 are substantially equal, and they are also substantially equal to the speed of the carrier 23. At this equal speed point, an output shift is made to shift the power transmission from the gear 30 to the gear 31 by first engaging the clutch 38, 39 and then immediately thereafter disengaging the clutch 34, 35. This is a loaded power shift and an overlap in the engagement and disengagement of the clutches must exist in order to avoid interruption of power flow.

As soon as this shift is accomplished, Range III is entered. The functions of the hydraulic units are now reversed, and the hydraulic A unit 45, while still connected to the sun gear 31 through the clutch 43 is now also connected to the output shaft 30 through the clutch 38, 39. The A unit 45 now begins to act again as a motor, and the transmission enters another output coupled mode of operation. This continues throughout Range III, with the hydraulic A unit 45 gradually adding less and less torque to the output by reducing its displacement to zero, while the hydraulic B unit 48 remains at constant displacement. As in Range I, the pressure is a constant in Range III.

At the end of Range III, a hydraulic unloaded shift is made into Range IV, at the time when the hydraulic A unit 45 reaches zero stroke. Then it is disconnected from the gear 31 by unclutching the clutch 43 immediately after it has been connected to the ring gear 30 by energizing the clutch 44. The unloaded shift means again that the timing problem is not so critical as in the loaded shift. Once that shift is made, the hydraulic units again go through the same mode of operation already described in connection with Range II; thus the A unit 45 is stroked past zero in the opposite direction and acts as a motor to rotate the gear 30 in a direction that further speeds up the output gear 31. Range IV continues, with the sun gear 31 serving as the output gear and the ring gear 30 serving as a second reaction gear, in addition to the reaction gear 54.

Figure 10:
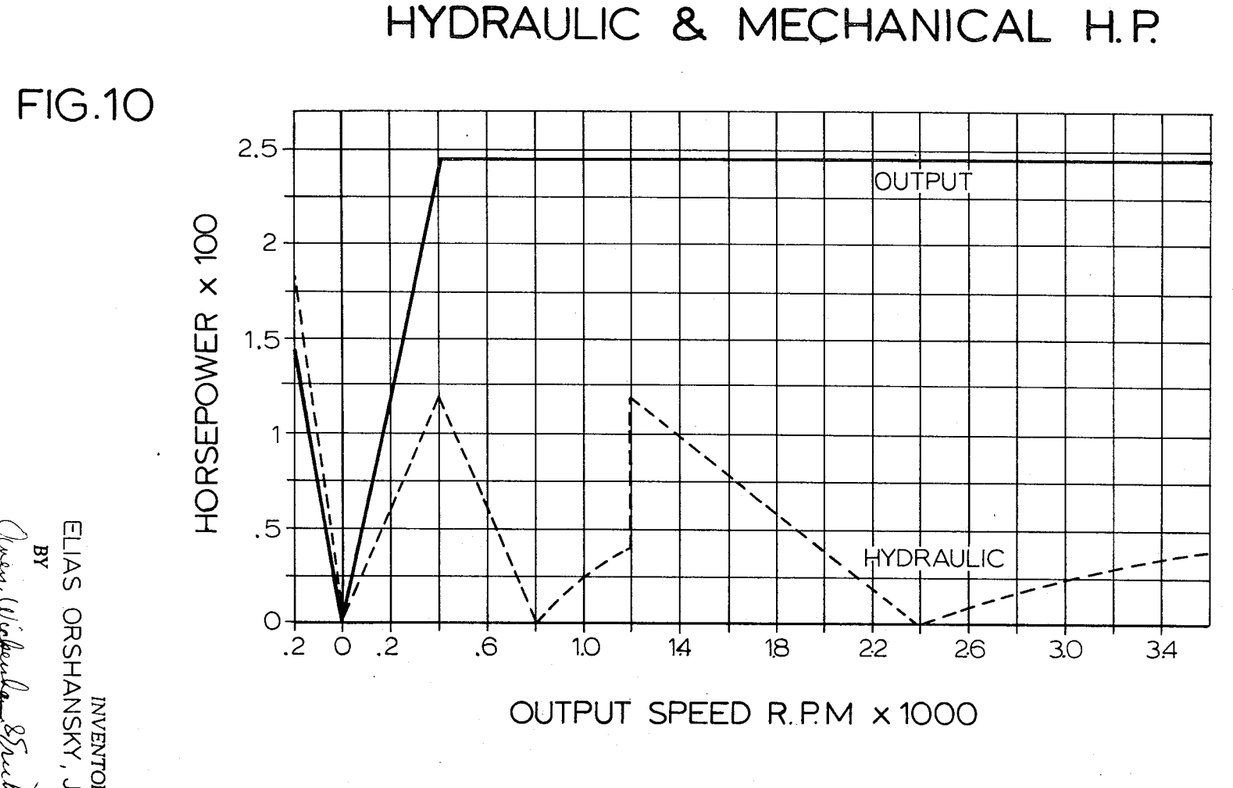
FIG. 10 is a graph showing the hydraulic and mechanical horsepower for the transmission of FIGS. 1 through 6, with the horsepower in increments of 100 plotted against the output speed in increments of 1,000 RPM.

The horsepowers and the relation of the hydraulic horsepower to the total horsepower are shown in FIG. 10.

Figures 5, 6, 7:
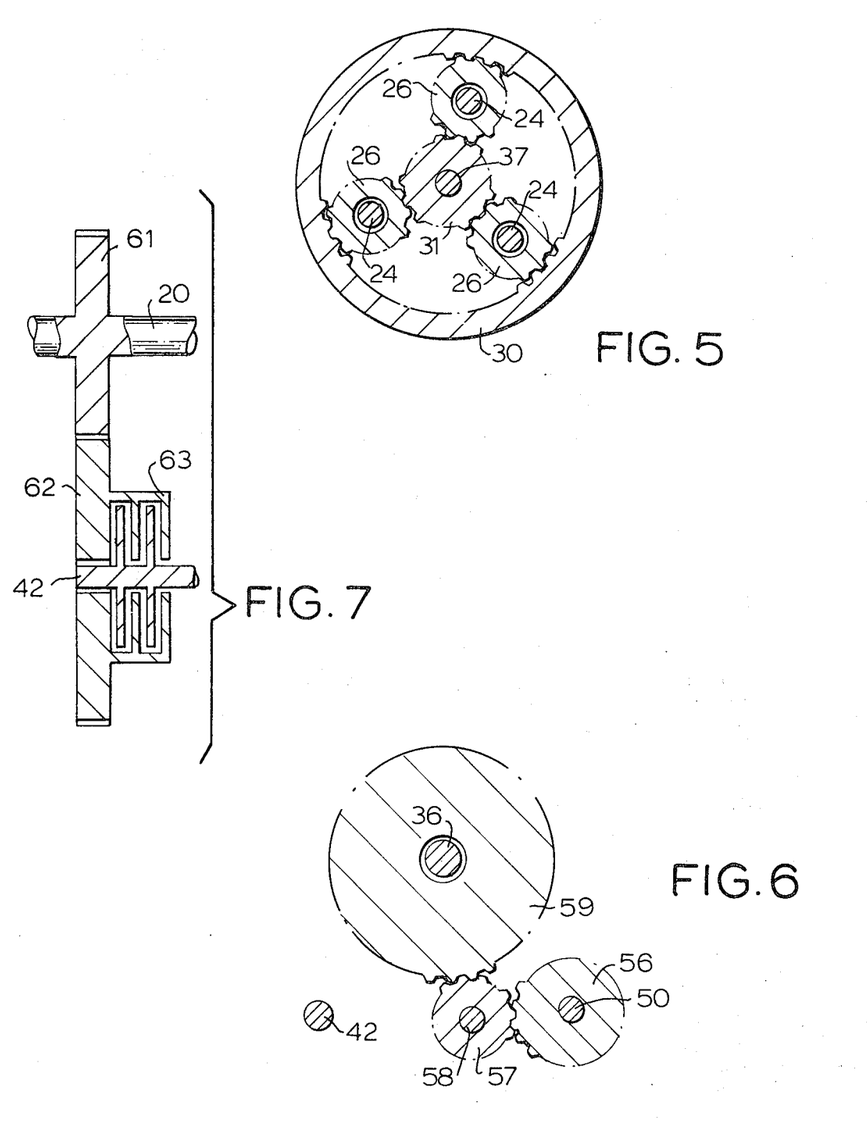
FIG. 5 is a view in section taken along the line 5—5 in FIG. 1.
FIG. 6 is a view in section taken along the line 6—6 in FIG. 1.
FIG. 7 is a fragmentary view of a portion of a transmission generally similar to that of FIG. 1 but with a modification therein.
Figure 8:
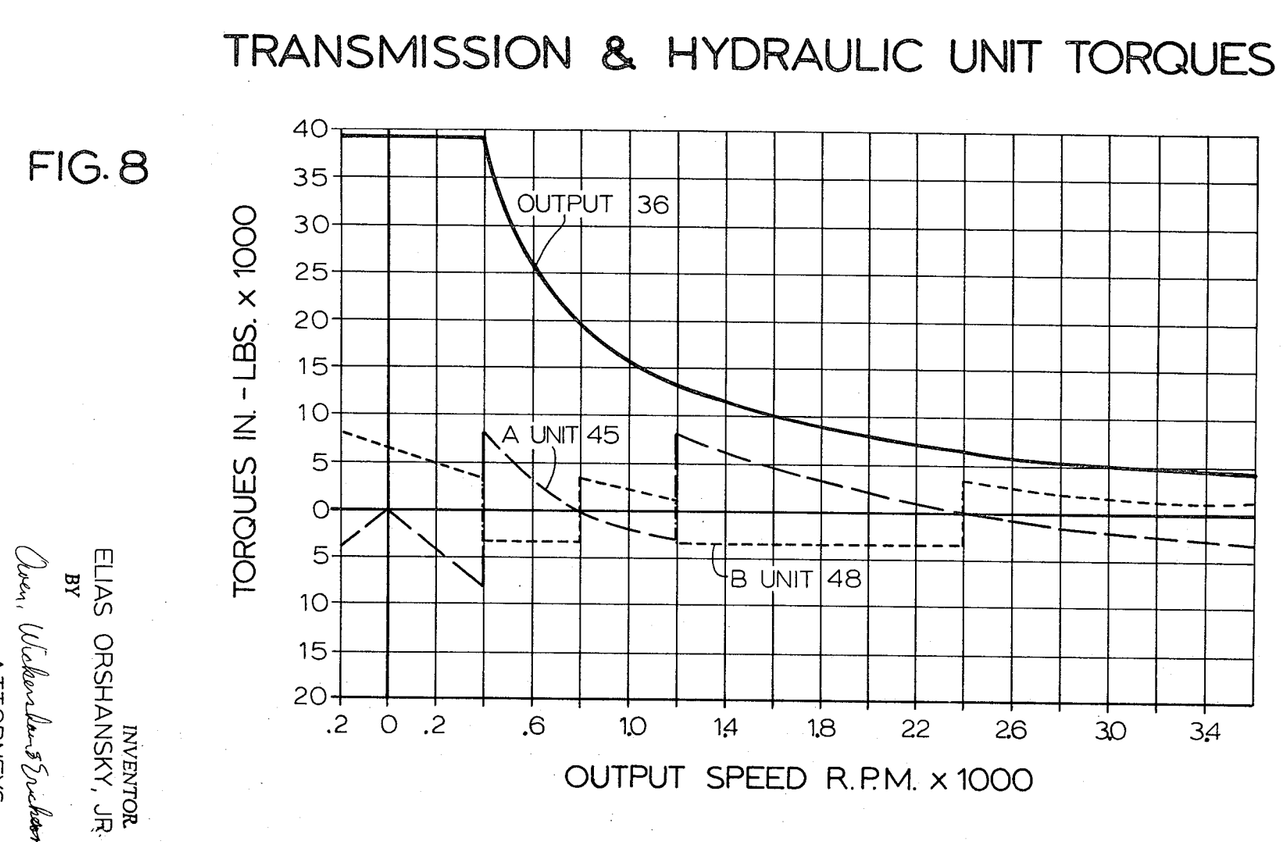
FIG. 8 is a graph of the transmission and hydraulic unit torques produced by the form of the invention shown in FIGS. 1 to 6, with the torques in thousand pound increments plotted against the output speed in thousand RPM increments.

FIG. 7 provides an improved reverse operation. The input shaft carries a gear 61 meshed with a gear 62 that is around the auxiliary shaft 42 and is clutchable to it by a clutch 63. The system of FIGS. 1–6 relies on the hydraulic power exceeding the mechanical power in reverse, acting in opposition to it and overcoming it. Consequently, it is inefficient in reverse and incapable of developing much speed. The system of FIG. 7 eliminates mechanically transmitted power in reverse (since it would then be in opposition to the direction of drive) and is therefore able to use the hydraulic power unopposed. It is a hydrostatic reverse and can attain whatever speed the hydraulic system is capable of attaining.

When the clutch 63 is engaged — and at this time no other clutch is engaged except the clutch 55 — the power flows directly from the engine through the shaft 20, gears 61 and 62, clutch 63, and shaft 42 to drive the hydraulic A unit 45 as a pump and delivers power to the B unit 48, acting as a motor. The B unit 48 drives the output shaft 36 through the shaft 50 and the gears 56, 57, and 59. The planetary assembly 25 performs no function at this time.

The system of FIG. 7 can also be used in the starting range by proper selection of the sizes of hydraulic units 45 and 48 and of gear ratios of the gears 61 and 62. It reduces the maximum pressure in starting.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A power transmission comprising input means, output means, and a plurality of gear trains intermediately connected to each other by a first planet gear set of a planetary gear assembly having a second planet gear set intermeshed with said first set, said trains being of overlapping speed ratios for connecting said input and output means, and each having an output gear, means for successively connecting said output gear of each train to drive the output means through a preselected speed range, means for disconnecting each driving train from the output means after the following train has been connected thereto, a reaction gear in mesh with said second planet gear set, a first hydraulic unit in driving engagement with said reaction gear, a second hydraulic unit hydraulically connected to said first hydraulic unit, one said hydraulic unit serving as a pump while the other one serves as a motor, and vice versa, and means for alternately connecting and disconnecting each said output gear to said second hydraulic unit, to serve as a reaction gear under some conditions and under other conditions to add torque to said output means from said hydraulic units without the hydraulically transmitted power going through said planetary assembly.

2. The power transmission of claim 1 having a gear clutchable to said output means, a gear secured to a shaft in driving relation to said first hydraulic unit, and a gear train connecting those two gears, for use in a reverse range and in a starting range.

3. The power transmission of claim 1 having a gear associated with said input means and meshed to a gear that is associated with said second hydraulic unit, and clutching means for establishing through these gears a driving connection between said input means and said second hydraulic unit, for use in a purely hydrostatic start and reverse range.

4. The power transmission of claim 1 wherein said output means and said planetary gear arrangement are co-axial.

5. A power transmission comprising
driving means,
a planetary gear train connected to said means and having first and second sets of planet gears and a common carrier, one set being intermeshed with the other,
a pair of output gears each in mesh with said first set of planet gears,
a reaction gear in mesh with said second set of planet gears,
a first hydraulic unit in driving engagement with said reaction gear,
a second hydraulic unit hydraulically connected to said first hydraulic unit, one said hydraulic unit serving as a pump while the other one serves as a motor, and vice versa,
an output shaft,
clutch means for directly connecting each said output gear to said output shaft, and
means for alternately connecting and disconnecting each said output gear to said second hydraulic unit to function as a reaction gear in some instances and in other instances to add power to said output shaft without sending that added power through the planetary gear train.

6. The power transmission of claim 5 having means for causing the ratio of maximum speed to minimum speed for both said output gears to be the same.

7. The power transmission of claim 5 wherein no member of the planetary gear train, except the planet gears, can have a speed in excess of the maximum of the higher speed output gear.

8. The power transmission of claim 5 having an output shaft and means for clutching said output shaft directly to either said output gear, said planetary gear arrangement being co-axial with said output shaft.

9. The power transmission of claim 5 wherein said first hydraulic unit has a shaft in driving relation thereto, and a gear train and clutching means for connecting that said shaft in direct driving relation to said output shaft.

10. The power transmission of claim 9 having a gear train and clutching means for connecting said input shaft to said second hydraulic unit.

11. A power transmission comprising
input means,
output means,
a pair of gear trains for alternately connecting said input means with the output means, the trains comprising transmission ranges of different ratios and including a planetary gear assembly with a first set of planet gears intermeshed with a second set of planet gears and a common carrier for both sets of planet gears driven by said input means, a pair of output gears both meshing with said first set of planet gears, the ends of said ranges overlapping from one train to the next,
means for alternately connecting and disconnecting the gear trains to the output means at said overlapping ends, whereby power is transmitted alternately from said gear trains through the transmission ranges to gradually drive the output means through the speed ranges,
a reaction gear meshed with the second set of planet gears,
a first hydraulic unit in driving engagement with said reaction gear,
a second hydraulic unit hydraulically connected to said first hydraulic unit, one said hydraulic unit serving as a pump while the other one serves as a motor, and vice versa, and
means for alternately connecting and disconnecting each said output gear to said second hydraulic unit.

12. The power transmission of claim 11 wherein said first hydraulic unit has a shaft in driving relation thereto and a gear train and clutch combination for placing that said shaft in direct driving relation to said output means.

13. The power transmission of claim 11 wherein said planetary gear arrangement and said output means are co-axial.

14. The power transmission of claim 11 wherein the ratio of maximum speed to minimum speed is the same for both output gears.

15. A power transmission comprising
an input shaft having an input gear secured thereto,
an output shaft,
a planetary gear assembly having a single carrier, first and second sets of mutually intermeshing planet gears, a first sun gear meshed with said first set, a ring gear meshed with said first set, and a second sun gear meshed with said second set, said carrier having rigidly associated therewith a gear meshed with said input gear,
clutching means for directly clutching said ring gear to said output shaft,
clutching means for directly clutching said first sun gear to said output shaft,
a shaft for said second sun gear with an additional gear thereon,
a reaction shaft with a gear thereon meshed with said additional gear,
a first hydraulic unit in driving relation with said reaction shaft,
a second hydraulic unit hydraulically connected to said first hydraulic unit,
one said hydraulic unit serving as a pump while the other said hydraulic unit serves as a motor and vice versa,
an auxiliary shaft in driving relation to said second hydraulic unit,
a shaft connected to and supporting said first sun gear and having thereon a driven gear,
a gear meshed with said driven gear and clutchable to said auxiliary shaft,
a transmitting gear rigidly connected to said ring gear, and
a gear meshed with said transmitting gear and clutchable to said auxiliary shaft.

16. The power transmission of claim 15 wherein both said sun gears and their shafts and said planetary assembly and said output shaft are co-axial.

17. The power transmission of claim 15 having
a starting and reverse gear secured to said reaction shaft,
a drive gear mounted around said output shaft,
a clutch for clutching said drive gear to said output shaft, and
intermediate gear means connecting said starting and reverse gear to said drive gear.

18. The power transmission of claim 17 having
a gear secured to said input shaft,
a gear meshed to that gear, and
clutch means for clutching the last-named gear to said auxiliary shaft.

19. A method of operating a transmission of the type having a planetary gear assembly with a rotary input member, a rotary reaction member, and a pair of rotary output members, said transmission also having a pair of fluid pump-motors hydraulically connected together, each able to serve as a pump at some times and as a motor at other times, one serving as a pump when the other serves as a motor and vice versa, a first said pump-motor being connected to said rotary reaction member, a second pump-motor alternately connected by clutching and gear trains to each of said rotary output members, a main output shaft, and clutch means for directly clutching said main output shaft to each said rotary output member, comprising the steps of:
1. continuously driving said rotary input member,
2. transmitting torque from said rotary input member to said main output shaft through a first said rotary output member,
3. causing said first pump-motor to progress from its maximum speed to zero speed,
4. simultaneously causing said second pump-motor, to decrease its displacement from maximum to zero stroke,
5. whereby said first rotary output member increases its speed and the speed of the main output shaft while said second rotary output member decreases its speed,
6. shifting synchronously the drive to said second pump-motor from said first rotary output member to said second rotary output member at an overlapping ratio,
7. reversing the functional operation of said two pump-motors, so that the second pump-motor progresses from zero stroke to full stroke in the opposite direction from before the shifting step while the first pump-motor increases from zero speed to maximum speed in the opposite direction of rotation and so that said second rotary output member continues to decrease its speed while the speed of said first rotary output member continues to increase until said first and second rotary output members are at the same speed,
8. shifting synchronously the drive to said main output shaft from said first rotary member to said second rotary member,
9. again reversing the functional operation of said pump-motors, and
10. continuing to increase the speed of said main output shaft by operating the pump-motors again as in steps (3), (4), (5), (6) and (7).

20. The method of claim 19 characterized by a constant ratio between the maximum and minimum speeds of said main output shaft for both said rotary output members.

* * * * *